United States Patent [19]
Minick

[11] Patent Number: 5,246,503
[45] Date of Patent: Sep. 21, 1993

US005246503A

[54] AQUEOUS BASED COMPOSITION CONTAINING ORGANIC SOLVENTS FOR REMOVING COATINGS

[75] Inventor: Chris A. Minick, Stillwater, Minn.

[73] Assignee: Minnesota Mining and Manufacturing Company, St. Paul, Minn.

[21] Appl. No.: 775,192

[22] Filed: Oct. 11, 1991

[51] Int. Cl.$^5$ ............................................. C23D 17/00
[52] U.S. Cl. ..................................... 134/38; 252/541; 252/153; 252/170; 252/171; 252/173; 252/DIG. 8
[58] Field of Search ................... 134/38; 252/541, 153, 252/170, 171, 173, DIG. 8

[56] References Cited

U.S. PATENT DOCUMENTS

| | | | |
|---|---|---|---|
| 3,615,825 | 10/1971 | Gansser | 134/38 |
| 3,681,250 | 8/1972 | Murphy | 252/158 |
| 3,702,304 | 11/1972 | Esposito | 252/171 |
| 3,925,231 | 12/1975 | Ritzi | 252/171 |
| 3,972,839 | 8/1976 | Murphy | 252/548 |
| 4,120,810 | 10/1978 | Palmer | 252/153 |
| 4,445,939 | 5/1984 | Hodson | 134/2 |
| 4,446,044 | 5/1984 | Rutkiewic | 252/170 |
| 4,483,783 | 11/1984 | Albanese | 252/DIG. 8 X |
| 4,508,634 | 4/1985 | Elepano et al. | 252/163 |
| 4,606,840 | 8/1986 | Gautier et al. | 252/DIG. 8 X |
| 4,680,133 | 7/1987 | Ward | 252/153 |
| 4,780,235 | 10/1988 | Jackson | 252/170 |
| 4,927,556 | 5/1990 | Pokorny | 252/173 |
| 4,956,115 | 9/1990 | De Mark | 252/DIG. 8 X |
| 4,986,936 | 1/1991 | Wolbers | 252/173 X |
| 5,006,279 | 4/1991 | Grobbel et al. | 252/DIG. 8 X |

FOREIGN PATENT DOCUMENTS

| | | |
|---|---|---|
| 0294041 | 12/1988 | European Pat. Off. . |
| 0407952A1 | 1/1991 | European Pat. Off. . |
| 1806026 | 5/1970 | Fed. Rep. of Germany . |
| 3438399C1 | 3/1986 | Fed. Rep. of Germany . |
| 3903465 | 8/1990 | Fed. Rep. of Germany . |
| 57-83598 | 5/1982 | Japan . |
| 642273 | 4/1984 | Switzerland . |

OTHER PUBLICATIONS

European Search Report.

*Primary Examiner*—Patrick P. Garvin
*Attorney, Agent, or Firm*—Gary L. Griswold; Walter N. Kirn; David L. Weinstein

[57] ABSTRACT

Composition for removing coatings from surfaces comprising at least one organic solvent, water, at least one thickening agent, and at least one surfactant. The composition contains sufficient water to decrease the evaporation rate of the solvent, and render the composition resistant to ignition, thereby making the composition a more effective coating removal composition and decreasing the hazards associated with the organic solvents.

18 Claims, 2 Drawing Sheets

AQUEOUS BASED COMPOSITION CONTAINING ORGANIC SOLVENTS FOR REMOVING COATINGS

BACKGROUND OF THE INVENTION

1. Field of the Invention

This invention relates to compositions for removing coatings from surfaces.

2. Discussion of the Prior Art

Compositions for removing paints, varnishes, and other coatings have been available for many years. Most of these compositions fall within two general classes. The first type attacks the coating by the chemical action of the ingredients thereof, which generally comprise alkalis or acids. This type of coating remover comprises alkali and acid compositions, such as those described in U.S. Pat. Nos. 3,681,250; 3,615,825; and 3,972,839. The alkali or acid compositions require considerable post-removal treatment to insure complete removal of the alkali or acid, and have been found to discolor wood. The second type depends upon the solvent power of the constituents of the composition to dissolve or at least soften the coatings. In the second type, it is customary to use aromatic hydrocarbons, lower aliphatic esters, ketones, alcohols, chlorinated solvents, or similar organic solvents. However, the vapor pressure of such liquids is high, with the result that they evaporate quickly, thereby rendering it difficult to adhere to a surface for a sufficiently long time to remove coatings therefrom. It has been proposed to overcome this difficulty by gelling the solvent, for example, by adding a wax thereto. Although these solvents have received wide usage and have been found to have acceptable coating removal qualities, their use is being questioned on the grounds of the safety hazards they present to the users thereof, namely toxicity. Moreover, many of the solvents having a high vapor pressure present a fire hazard, on account of their low flash points and ignition temperatures U.S. Pat. No. 4,120,810 discloses the use of N-methyl 2-pyrrolidone and a mixture of aromatic hydrocarbons having more than six carbon atoms as a paint stripper effective on a wide range of surfaces and capable of penetrating many layers of paint per application primarily because of its slow evaporation rate. This material suffers from the high cost of raw materials and the suspected toxic effects of the aromatic materials used.

SUMMARY OF THE INVENTION

This invention provides an aqueous-based, low-toxicity, non-flammable, thixotropic composition for rendering coatings removable from surfaces.

The composition is a stable emulsion comprising (1) at least one organic solvent having an open cup flash point equal to or less than 100° F., (2) water, (3) at least one thickener, and (4) at least one surfactant. The amount of organic solvent in the composition must be sufficient to effectively remove coatings from surfaces. The amount of thickener and the amount of surfactant in the composition must be sufficient to allow the composition to exist as a stable emulsion, i.e., having a shelf life in excess of six months with less than 5% separation of solvent. The composition must contain sufficient water to cause the mixture to be resistant to ignition, e.g., by flames from matches, lighters, etc. The composition preferably contains from about 50% to about 95% by weight water, more preferably from about 55% to about 90% by weight water, and most preferably from about 60% to about 85% by weight water.

It has been discovered that by combining an organic solvent or solvents selected from those whose overall Hansen Solubility Parameter is at least 7.5, whose polar index is greater than 3.0, and whose hydrogen bonding index less than 5.0, water, a thickener, and a surfactant, a stable emulsion can be formed wherein the effectiveness of the action of the solvent is only slightly reduced as compared with that of the pure solvent. Examples of solvents useful in this invention include solvents that are insoluble in water, such as, for example, ethyl acetate, toluene, and methyl ethyl ketone. Furthermore, the open cup flash point of the composition can be made to be greater than about 100° F.

The composition is effective on a wide variety of coatings and surfaces. The composition is useful for rendering organic polymeric coatings and finishes such as paints, varnishes, lacquers, shellacs, gums, natural and synthetic resins removable from such surfaces as wood, metal, glass, and plastic. The composition has also been found to be effective for removing paints, inks, grease, and the like from skin. An important feature of the composition is that it provides excellent results without the need of skinning agents, such as wax, which have the disadvantage that they contaminate the substrate and must be removed before finishing.

DETAILED DESCRIPTION

Figure 1:
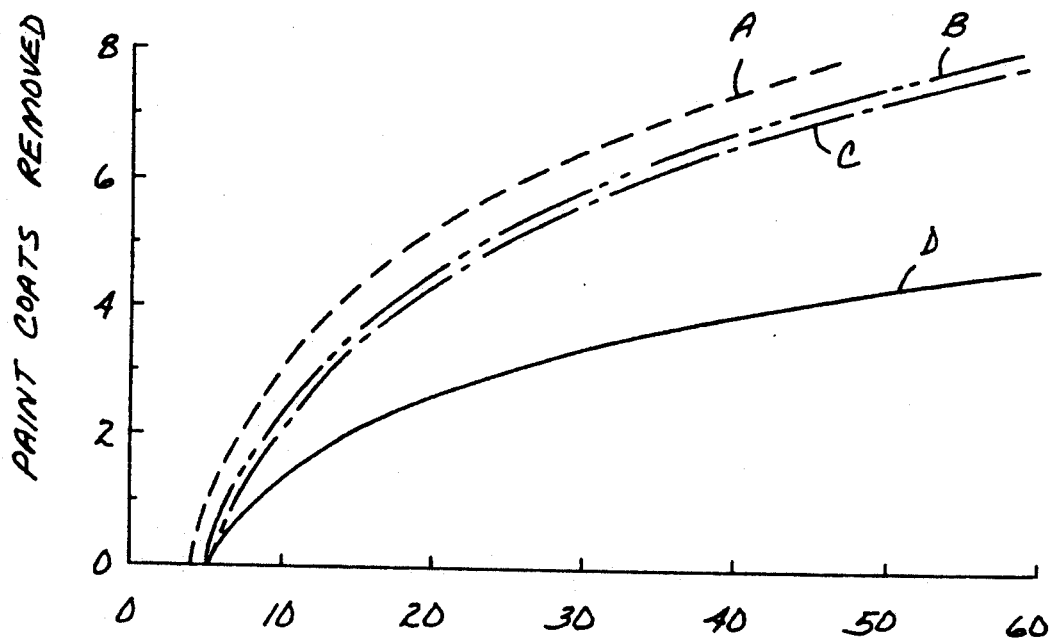
FIG. 1 is a graph that compares rate of paint removal for various concentrations of an aqueous emulsion of ethyl acetate.

The composition of this invention comprises water, at least one organic solvent, at least one thickener, and at least one surfactant. By combining the organic solvent with water, thickener, and surfactant, the emulsion formed thereby remains stable and the effectiveness of the organic solvent as a remover of organic coatings is only slightly reduced from what it would have been if the organic solvent had not been diluted with water.

It has been found that the Hansen Solubility Parameter can be used for selecting solvents that function as coating removers, e.g., paint strippers, when used in the form of an aqueous emulsion. A detailed discussion of Hansen Solubility Parameters can be found in *Kirk-Othmer Encyclopedia of Chemical Technology*, Suppl. Vol., 2nd ed., 1971, p. 889ff, incorporated herein by reference. The Hansen Solubility Parameter involves a mathematical method of characterizing the power of solvents to dissolve paint resins. Hansen Solubility Parameters differ from other solubility parameters in that the Hansen parameter separately calculates the non-polar, polar, and hydrogen bonding components of the total solubility parameter, thereby allowing the formulator to select a solvent based on four parameters rather than just one. The solubility parameters for most polymers and resins related to coatings, e.g., paint, have been published (see, for example, *Tables of Solubility Parameters*, Union Carbide Corporation, Tarrytown, N.Y., 1975). Methods for determining the solubility parameters of unreported chemicals are set forth in ASTM D3132-84.

The components of the Hansen Solubility Parameter of a solvent are (1) a non-polar index, (2) a polar index, and (3) a hydrogen bonding index. It is known empirically that the hydrogen bonding index is an approximate measure of the water solubility of a solvent and can be used to predict which solvents can form stable emulsions. In general, a solvent having a high polar index, e.g., greater than 3.0, and having a relatively low hydrogen bonding index, e.g., less than 5.0, and having an overall Hansen Solubility Parameter of at least 7.5, are effective as solvents for removing paint when used in the form of an emulsion. Combinations of solvents that have reasonably similar index component values can be used in place of a sole solvent.

Solvents having a high non-polar index, a low polar index, and a low hydrogen bonding index are not effective for removing paint from a surface.

For example, the indexes and Hansen Solubility Parameter of heptane are as follows:

| non-polar index | 7.27 |
| polar index | 0.00 |
| hydrogen bonding index | 0.00 |
| Hansen Solubility Parameter | 7.27 |

Solvents having a high hydrogen bonding index do not function effectively for removing paint from a surface, even if the polar index is also high.

For example, the indexes and Hansen Solubility Parameter of water are as follows:

| non-polar index | 5.95 |
| polar index | 11.12 |
| hydrogen bonding index | 19.77 |
| Hansen Solubility Parameter | 23.45 |

Solvents having a medium hydrogen bonding index and a moderate polar index have been found to be the best paint removers. Such solvents are called Group II solvents in the pain industry.

For example, the indexes and Hansen Solubility Parameter of methyl ethyl ketone are as follows:

| non-polar index | 6.88 |
| polar index | 4.52 |
| hydrogen bonding index | 4.63 |
| Hansen Solubility Parameter | 9.45 | and the indexes and Hansen Solubility Parameter of toluene are as follows:

| non-polar index | 6.96 |
| polar index | 4.71 |
| hydrogen bonding index | 3.26 |
| Hansen Solubility Parameter | 9.01 |

When solvents are combined in a mixture, the Hansen Solubility Parameter of the mixture is approximately equal to the weighted average of the Hansen Solubility Parameters of the individual solvents, based on the molar volume of each solvent. Within a particular class of solvents, the size of the solvent molecule determines the speed of removal of a coating from a surface (e.g., methyl ethyl ketone removes paint faster than does methyl isobutyl ketone, which in turn removes paint faster than does methyl isoamyl ketone). Within a particular class of solvents (e.g., trichloroethanes), the position of pendent groups affects the rate of coating removal (e.g., 1,1,2-trichloroethane can remove two coats of paint in 45 seconds, and 1,1,1-trichloroethane can remove two coats of paint in 11 minutes).

It is preferred that the solvents of the composition of the present invention have flash points of 100° .F or lower because these solvents are generally more effective in removing coatings, for the reason that the small size of their molecules allows greater penetration of organic coatings. Particular classes of solvents that can be used in the present invention include aromatic hydrocarbons, halogenated hydrocarbons, esters, ethers, ketones, and nitroparaffins.

The purpose of the water is to act as a carrier and suppress the evaporation of the organic solvent, in order to allow the coating removal formulation to be applied to the surface and allow sufficient time for the organic solvent to swell the coating. The amount of water must be sufficient to render the composition resistant to ignition. As used herein, the phrase "resistant to ignition" means incapable of being ignited upon being subjected to the flame of a lighted match or lighter or the like. The composition preferably contains at least 50% by weight water, more preferably at least 55% by weight water, and most preferably at least 60% by weight water. If less than 50% by weight water is employed, the composition tends to be ineffective because the organic solvent evaporates before complete coating removal has occurred. Furthermore, the composition has less resistance to ignition when less than 50% by weight water is employed.

The purpose of the thickener is to stabilize the solvent/water emulsion and provide good flow control, i.e., the presence of thickener allows the composition to be applied easily, level out, and have the ability to cling to a vertical surface for a sufficient period of time for the solvent to soften the coating on the surface. It is recommended that the thickener be soluble in water or swellable in water and be capable of promoting formation of a stable emulsion of the composition of this invention.

Thickeners that are preferred for the composition of the present invention include gums, e.g., xanthan, guar, locust bean, alginates, polyvinyl alcohol, polyacrylates, starches, clay derivatives, e.g., amine treated magnesium aluminum silicate, and cellulose derivatives, e.g., hydroxypropyl methylcellulose. The thickeners that are most preferred are the clay derivatives, cellulose derivatives, and xanthan gum.

The purpose of the surfactant is to promote creation of a stable, homogeneous emulsion. Surfactants that are useful in the composition of the present invention include nonionic, cationic, and anionic surfactants. The surfactants suitable for the composition of this invention preferably have an HLB value of from about 8 to about 18. If a blend of surfactants is used, it is preferred that the blend have an overall HLB value of from about 8 to about 18. The particular HLB value required is dependent upon the organic solvent selected.

Surfactants that can be used to prepare the composition of the present invention include polyoxyethylated fatty amines, polyoxyethylated ethers, polyoxyethylated sorbitan esters, polyoxyethylated sorbitol esters, dodecyl benzene sulfonic acid salts, polyalkylene oxide-modified methylpolysiloxanes, alkylphenol ethyoxylates, polyoxyethylene sorbitan fatty acid esters, and sorbitan fatty acid esters.

Surfactants that are preferred for the composition of the present invention include polyoxyethylene sorbitan monooleate and sorbitan monooleate. Selection of the particular surfactant can be facilitated by the procedures described in *Kirk-Othmer Encyclopedia of Chemical Technology*, Third Edition, Vol. 8, John Wiley & Sons, Inc. (1979), pp. 909-919, incorporated herein by reference, or by the procedures described in the "HLB System, a time-saving guide to emulsifier selection," ICI United States Inc., Specialty Chemicals Division (1976).

Other additives that are useful in the composition of the present invention include abrasive particles such as aluminum oxide, silicon carbide, and pumice.

The amount of organic solvent must be sufficient to insure effective removal of coatings from surfaces. The amount of thickener and the amount of surfactant must be sufficient to allow the composition to exist as a stable emulsion. The amount of water can vary and is essentially the difference between the total amount of the composition and the amount of organic solvent component, thickener component, and surfactant component.

The concentration of water in the composition can range from about 50% by weight to about 95% by weight and the concentration of organic solvent or solvents can range from about 5% by weight to about 50% by weight, preferably from about 10% by weight to about 45% by weight, more preferably from about 20% by weight to about 35% by weight. The concentration of thickener or thickeners can range from about 1% by weight to about 10% by weight. The concentration of surfactant or surfactants can range from about 0.1% by weight to about 10% by weight. As stated previously, the composition preferably contains at least 50% by weight of water. At these concentrations, the concentration of solvent in the vapors of the composition is sufficiently low that ignition of the vapors will not occur upon being subjected to the flame of a match, lighter, etc.

The composition of this invention can be prepared by first adding thickener or thickeners and other additives to water, then adding surfactant or surfactants and organic solvent or solvents to the resulting mixture. The mixture can then be mixed vigorously, as with a high shear impeller, in order to form an emulsion.

While the organic solvent of proper Hansen Solubility Parameters are known to be capable of removing coatings by themselves, their viscosity and vapor pressure render them marginally effective for use on vertical surfaces. They tend to evaporate quickly or run off of the coated surface before removing the coating. The presence of water, thickener, and surfactant renders the total composition capable of clinging to vertical surfaces and retarding evaporation of the solvent. It is preferred that the composition have the ability to cling to a vertical surface for a sufficient period of time for the solvent to soften the coating on the surface. The presence of water, thickener, and surfactant does not substantially reduce the efficacy of the solvents as a coating remover. Furthermore, the presence of water allows the expensive solvent to be used economically as a paint remover.

Dissolution of a polymeric film is rarely carried out, except in the case of some lacquers and shellacs, which are removable by selective solvents. In general, the film coating is caused to swell or soften so that the film may be easily removed by flushing with water or scraping. In this invention, the solvent or solvent blend is absorbed by the film, thereby causing it to swell.

The composition of this invention can also be used as a skin cleaner for removal of such materials as paints, varnishes, stains, inks, grease, etc.

In order to enhance the cleaning properties of the composition, a nonwoven material, such as a "BUF PUF" cleaning pad or one of the "BRUSHLON" abrasive products such as the "SCRUBTEAM" brush or the short trim "BRUSHLON" brush, can be used to abrade the coating to be removed.

The following examples are set forth to further illustrate this invention and are not intended to limit the scope thereof. All percentages are percentages by weight unless indicated otherwise.

EXAMPLES 1-2

The solvents in Table I were used to prepare compositions of this invention.

TABLE I

| Solvent | Polar index | Hansen Hydrogen bonding index | Solubility Parameter |
|---|---|---|---|
| Nitromethane | 6.33 | 0.0 | 11.23 |
| Methyl ethyl ketone | 4.52 | 4.63 | 9.45 |

Solution Preparation

To deionized water was added a six percent aqueous solution of magnesium aluminum silicate powder ("VEEGUM D," R. T. Vanderbilt Company Inc.). After the resulting solution was thoroughly mixed at ambient temperature by means of high shear impeller, a surfactant mixture (50% sorbitan monooleate, "SPAN 80," ICI Americas, Inc./50% polyoxyethylene 20 sorbitan monooleate, "TWEEN 80," ICI Americas, Inc., HLB of mixture=10) was added with mixing. Then a given amount of selected solvent was added along with additional thickeners and the resulting mixture was mixed until homogeneous. Table II lists the ingredients and amounts thereof for the foregoing solution preparations.

TABLE II

| Ingredient | Amount (g) A | B | C |
|---|---|---|---|
| Thickener, 6% solution in water ("VEEGUM D", R.T. Vanderbilt Company, Inc.) | 36 | 36 | 36 |
| Deionized water | 21 | 36 | 51 |
| Surfactant ("SPAN 80", ICI Americas, Inc.) | 0.16 | 0.16 | 0.16 |
| Surfactant ("TWEEN 80", ICI Americas, Inc.) | 0.16 | 0.16 | 0.16 |
| Solvent | 40 | 24 | 10 |
| Thickener ("RHODOPOL 23", R.T. Vanderbilt Company, Inc.) | 0.3 | 0.5 | 0.5 |
| Thickener ("METHOCEL J20MS", Dow Chemical Co.) | 0.6 | 0.9 | 0.9 |

In the foregoing preparation, about three-fourths of the solvent was added prior to addition of the "RHODOPOL 23" and "METHOCEL J20MS" thickeners. These thickeners were dispersed in the remaining one-fourth of the solvent, and the portion of the solvent containing these two thickeners was added to the mixture prior to the final mixing operation. The mixtures were then tested according to the following procedure.

Paint removal tests for Examples 1 and 2 were conducted on standard automotive paint test panels purchased from Parker Test Panels Corporation of Madison Heights, Mich., a division of Hooker chemicals and Plastics corporation. The panels were coated with one coat of gray primer and one coat of white automotive paint. The length of time required to remove one coat and two coats of paint was measured for each solvent and solvent emulsion. The test was complete when either all paint had been removed, or when thirty minutes had elapsed. Paint was lifted off the surface of the test panel by means of a wooden scraper.

EXAMPLE 1

Nitromethane, a flammable solvent, was tested in this example. The results are set forth in Table III.

TABLE III

| Formulation | Time to remove (sec) | |
|---|---|---|
| | one coat | two coats |
| 100% Solvent (no water) | 10 | 15 |
| A | 50 | 90 |
| B | 90 | 150 |
| C | 210 | 300 |

Formulations A, B, and C could not be ignited when a flame was brought near. In this example, and in Examples 2-14, resistance to ignition was tested in the following manner: About one tablespoon of the formulation containing the flammable solvent was placed on a wooden board. The formulation was spread out to cover a circle having a diameter of about 2 inches, and a lighted match was brought in contact with the formulation. The formulation was deemed resistant to ignition if no ignition of the formulation was observed.

EXAMPLE 2

Methyl ethyl ketone, a flammable solvent, was tested in this example. The results are set forth in Table IV.

TABLE IV

| Formulation | Time to remove (sec) | |
|---|---|---|
| | one coat | two coats |
| 100% Solvent (no water) | 30 | 65 |
| A | 42 | 88 |
| B | 103 | 223 |
| C | >1800 | — | formulations A, B, and C could not be ignited when a flame was brought near.

EXAMPLES 3-14

Aqueous emulsions having the following formulations were prepared according to the method described previously for preparing the formulations of Examples 1 and 2. Tables V, VI, and VII list the ingredients and amounts thereof for Examples 3-14.

TABLE V

| | Amount (%) | | | |
|---|---|---|---|---|
| Ingredient | Example 3 | Example 4 | Example 5 | Example 6 |
| Deionized water | 56.7 | 41.7 | 26.7 | 11.7 |
| Thickener, 6% solution in water ("VEEGUM D") | 36.0 | 36.0 | 36.0 | 36.0 |
| Surfactant ("SPAN 80") | 0.45 | 0.45 | 0.45 | 0.45 |
| Surfactant ("TWEEN 80") | 0.45 | 0.45 | 0.45 | 0.45 |
| Solvent (Ethyl acetate) | 5.0 | 20.0 | 35.0 | 50.0 |
| Thickener ("RHODOPOL 23") | 0.5 | 0.5 | 0.5 | 0.5 |
| Thickener ("METHOCEL J20MS") | 0.9 | 0.9 | 0.9 | 0.9 |

| | Amount (%) | | | |
|---|---|---|---|---|
| Ingredient | Example 7 | Example 8 | Example 9 | Example 10 |
| Deionized water | 56.7 | 41.7 | 26.7 | 11.7 |
| Thickener, 6% solution in water ("VEEGUM D") | 36.0 | 36.0 | 36.0 | 36.0 |
| Surfactant ("SPAN 80") | 0.45 | 0.45 | 0.45 | 0.45 |
| Surfactant ("TWEEN 80") | 0.45 | 0.45 | 0.45 | 0.45 |
| Solvent (Methyl ethyl ketone) | 5.0 | 20.0 | 35.0 | 50.0 |
| Thickener ("RHODOPOL 23") | 0.5 | 0.5 | 0.5 | 0.5 |
| Thickener ("METHOCEL J20MS") | 0.9 | 0.9 | 0.9 | 0.9 |

TABLE VII

| | Amount (%) | | | |
|---|---|---|---|---|
| Ingredient | Example 11 | Example 12 | Example 13 | Example 14 |
| Deionized water | 56.7 | 41.7 | 26.7 | 11.7 |
| Thickener, 6% solution in water ("VEEGUM D") | 36.0 | 36.0 | 36.0 | 36.0 |
| Surfactant ("SPAN 80") | 0.45 | 0.45 | 0.45 | 0.45 |
| Surfactant ("TWEEN 80") | 0.45 | 0.45 | 0.45 | 0.45 |
| Solvent (Toluene) | 5.0 | 20.0 | 35.0 | 50.0 |
| Thickener ("RHODOPOL 23") | 0.5 | 0.5 | 0.5 | 0.5 |
| Thickener ("METHOCEL J20MS") | 0.9 | 0.9 | 0.9 | 0.9 |

In Examples 3-14, a sample of the coating removal formulation for each solvent at each concentration level was placed on a painted test panel made from metal. Each painted test panel had seven coats of colored paint on them, each coat being approximately 1 mil thick and each coat being of a different color. The paint of each coat was a solvent-based enamel. The panels were allowed to stand at ambient conditions for about one year before being used for testing coating removal formulations. The coating removal formulation was then removed from the panel at 10 minute, 20 minute, 40 minute, and 60 minute intervals and the number of paint coats removed was recorded. Paint was lifted off the surface of the test panel by means of a wooden scraper. This data is presented graphically in FIG. 1, FIG. 2, and FIG. 3.

Explanation of FIG. 1

Curve A in FIG. 1 represents the number of coats of paint removed by the formulations containing ethyl acetate after 60 minutes. For example, at an ethyl acetate concentration of 35% in the coating removal formulation, at least six coats of paint were removed after 60 minutes. Curve B in FIG. 1 represents the number of coats of paint removed by the formulations containing ethyl acetate after 40 minutes Curve C in FIG. 1 represents the number of coats of paint removed by the formulations containing ethyl acetate after 20 minutes. Curve D in FIG. 1 represents the number of coats of paint removed by the formulations containing ethyl acetate after 10 minutes.

Figure 2:
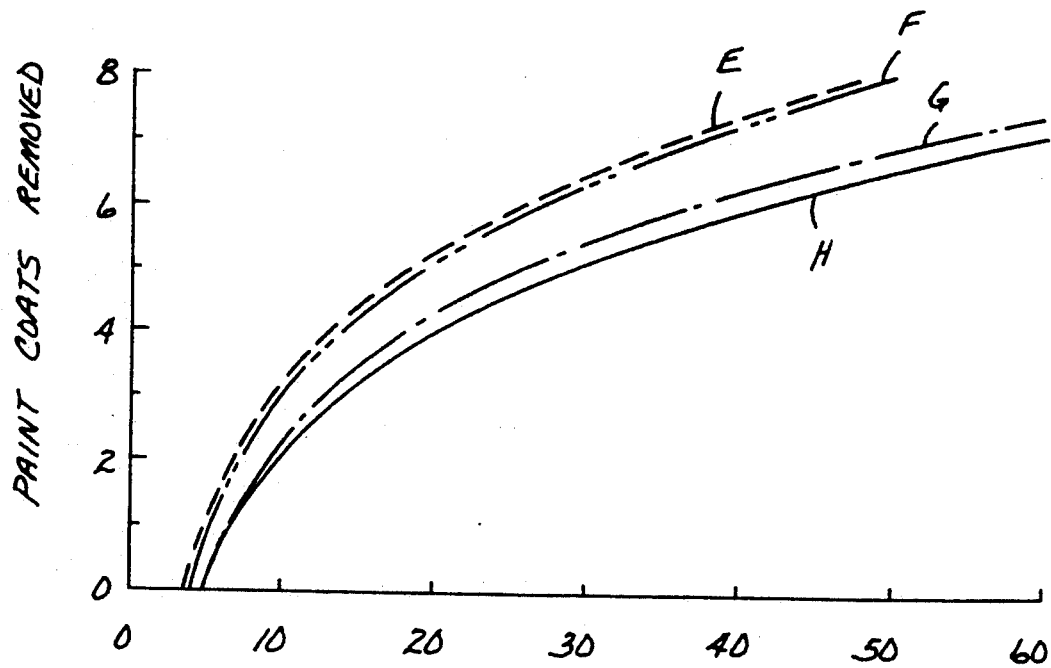
FIG. 2 is a graph that compares rate of paint removal for various concentrations of an aqueous emulsion of methyl ethyl ketone.

Explanation of FIG. 2

Curve E in FIG. 2 represents the number of coats of paint removed by the formulations containing methyl ethyl ketone after 60 minutes. For example, at a methyl ethyl ketone concentration of 35% in the coating removal formulation, at least six coats of paint were removed after 60 minutes. Curve F in FIG. 2 represents the number of coats of paint removed by the formulations containing methyl ethyl ketone after 40 minutes. Curve G in FIG. 2 represents the number of coats of paint removed by the formulations containing methyl ethyl ketone after 20 minutes. Curve H in FIG. 2 represents the number of coats of paint removed by the formulations containing methyl ethyl ketone after 10 minutes.

Figure 3:
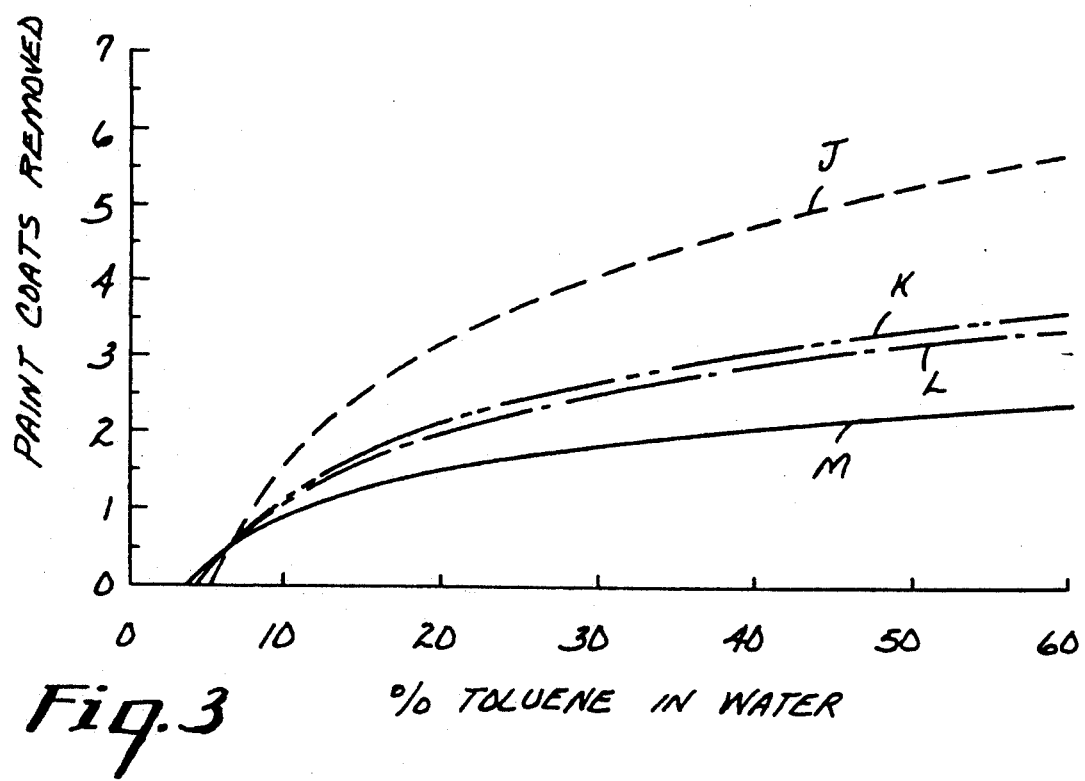
FIG. 3 is a graph that compares rate of paint removal for various concentrations of an aqueous emulsion of toluene.

Explanation of FIG. 3

Curve J in FIG. 3 represents the number of coats of paint removed by the formulations containing toluene after 60 minutes. For example, at a toluene concentration of 35% in the coating removal formulation, at least four coats of paint were removed after 60 minutes. Curve K in FIG. 3 represents the number of coats of paint removed by the formulations containing toluene after 40 minutes. Curve L in FIG. 3 represents the number of coats of paint removed by the formulations containing toluene after 20 minutes. Curve M in FIG. 3 represents the number of coats of paint removed by the formulations containing toluene after 10 minutes.

None of the solvent formulations of Examples 3-4 can be ignited by a flame from a match or a lighter.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Composition having the form of a stable emulsion and being capable of rendering a coating removable from a surface, said composition comprising:
    (a) a sufficient amount of at least one organic solvent to render a coating removable from a surface, said at least one organic solvent having a Hansen Solubility Parameter of at least 7.5, a polar index greater than 3.0, and a hydrogen bonding index less then 5.0, the open cup flash point of said at least one organic solvent being equal to or less than 100° F.;
    (b) a sufficient amount of water to render the composition resistant to ignition;
    (c) a sufficient amount of at least one thickener to allow the composition to exist as a stable emulsion; and
    (d) a sufficient amount of at least one surfactant to allow the composition to exist as a stable emulsion.

2. The composition of claim 1, wherein said at least one organic solvent is substantially non-miscible with water.

3. The composition of claim 1, wherein said at least one solvent comprises from about 5% to about 50% by weight of said composition.

4. The composition of claim 1, wherein said water comprises from about 50% to about 95by weight of said composition.

5. The composition of claim 1, wherein said water comprises from about 55% to about 95% by weight of said composition.

6. The composition of claim 1, wherein said water comprises from about 60% to about 95% by weight of said composition.

7. The composition of claim 1, wherein said at least one thickener comprises from about 1% to about 10% by weight of said composition.

8. The composition of claim 1, wherein said at least one organic solvent is selected from the group consisting of aromatic hydrocarbons, halogenated hydrocarbons, esters, ethers, ketones, and nitroparaffins.

9. The composition of claim 1, wherein said at least one thickener is selected from the group consisting of xanthan, guar, locust bean, alginates, polyvinyl alcohol, polyacrylates, starches, clay derivatives, and cellulose derivatives.

10. The composition of claim 8, wherein said at least one surfactant comprises from about 0.1% to about 10% by weight of said composition.

11. The composition of claim 8, wherein said at least one surfactant is selected from the group consisting of anionic, cationic, and nonionic surfactants.

12. The composition of claim 1, wherein said at least one surfactant is selected from the group consisting of polyoxyethylated fatty amines, polyoxyethylated ethers, polyoxyethylated sorbitan esters, polyoxyethylated sorbitol esters, dodecyl benzene sulfonic acid salts, polyalkylene oxide-modified methylpolysiloxanes, alkylphenol ethyoxylates, polyoxyethylene sorbitan fatty acid esters, and sorbitan fatty acid esters.

13. The composition of claim 1, wherein said at least one surfactant has an HLB value of from about 8 to about 18.

14. The composition of claim 1, wherein said at least one surfactant comprises a blend of surfactants, wherein the overall HLB value of said blend ranges from about 8 to about 18.

15. The composition of claim 1, wherein the open cup flash point of said composition is greater than about 100° F.

16. A method rendering a coating removable from a surface comprising the steps of:
    (1) providing the composition of claim 1;
    (2) applying said composition to a surface having a coating thereon;
    (3) allowing said composition to remain in contact with said coating for a sufficient time to bring about swelling or softening of said coating; and
    (4) removing said swelled or softened coating.

17. The method of claim 16, wherein said swelled or softened coating is removed by flushing with water.

18. The method of claim 16, wherein said swelled or softened coating is removed by scraping.

* * * * *

UNITED STATES PATENT AND TRADEMARK OFFICE
CERTIFICATE OF CORRECTION

PATENT NO. : 5,246,503
DATED : September 21, 1993
INVENTOR(S) : Minick

It is certified that error appears in the above-indentified patent and that said Letters Patent is hereby corrected as shown below:

Col. 10, line 13, "95by" should be --95% by--.

Signed and Sealed this

Eighth Day of November, 1994

Attest:

BRUCE LEHMAN

*Attesting Officer*     *Commissioner of Patents and Trademarks*